US010820077B1

(12) United States Patent
Pond

(10) Patent No.: US 10,820,077 B1
(45) Date of Patent: Oct. 27, 2020

(54) SPEAKER SYSTEM

(71) Applicant: Deere & Company, Moline, IL (US)

(72) Inventor: Daniel A. Pond, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/387,678

(22) Filed: Apr. 18, 2019

(51) Int. Cl.
*H04R 1/02* (2006.01)
*B60R 11/02* (2006.01)
*H04R 1/32* (2006.01)

(52) U.S. Cl.
CPC .......... *H04R 1/025* (2013.01); *B60R 11/0217* (2013.01); *H04R 1/323* (2013.01)

(58) Field of Classification Search
CPC ...... H04R 1/025; H04R 1/323; B60R 11/0217
See application file for complete search history.

(56) References Cited

U.S. PATENT DOCUMENTS

| | | | | |
|---|---|---|---|---|
| 3,818,138 A * | 6/1974 | Sperrazza, Jr. | ........ | H04R 1/323 381/336 |
| 4,357,490 A * | 11/1982 | Dickey | ................. | H04R 1/345 181/145 |
| 5,147,986 A * | 9/1992 | Cockrum | ............. | H04R 1/2842 181/145 |
| 5,523,524 A * | 6/1996 | Prokisch | .............. | H04R 1/2849 181/156 |
| 5,731,553 A * | 3/1998 | Ledoux | ................ | H04R 1/2842 181/151 |
| 5,847,331 A * | 12/1998 | Vollmer | ................. | H04R 1/345 181/147 |
| 8,526,655 B2 * | 9/2013 | Dibb | ...................... | H04R 1/025 381/345 |
| 8,577,073 B2 * | 11/2013 | Tracy | .................... | H04R 1/288 381/395 |
| 2003/0091211 A1 * | 5/2003 | Proni | ...................... | H04R 1/02 381/386 |
| 2003/0228027 A1 * | 12/2003 | Czerwinski | ............. | H04R 1/26 381/342 |
| 2014/0126761 A1 * | 5/2014 | Pham | ................... | H04R 1/2811 381/353 |
| 2014/0174847 A1 * | 6/2014 | Smith | .................. | H04R 1/2884 181/199 |
| 2018/0007463 A1 * | 1/2018 | Kim | ....................... | H04R 1/345 |

* cited by examiner

*Primary Examiner* — Oyesola C Ojo

(57) ABSTRACT

A speaker system including a box and a speaker. The box includes a top wall, a front inner sidewall, and a back inner sidewall. The front inner sidewall connects to the top wall and extends upwards therefrom, and the back inner sidewall connects to the top wall and extends upwards therefrom. The speaker is positioned between the front inner sidewall and the back inner sidewall. The front of the speaker is mounted to a top of the top wall. The top wall, the front inner sidewall, the back inner sidewall, and a front of the speaker partially define a sealed region.

18 Claims, 9 Drawing Sheets

SPEAKER SYSTEM

FIELD OF THE DISCLOSURE

The present disclosure relates to speaker system. More specifically, the present disclosure relates to a box and a speaker mounted thereto.

BACKGROUND

Some work machines include enclosed operator stations and speaker systems. These operator stations typically include one seat for an operator and sometimes include one seat for an operator in training. The operator station may also include levers, pedals, button, screens, vents, safety devices, a steering wheel, and a speaker system, just to name a few examples. The speaker system may include a plurality of speakers, and these speakers may require specific enclosures, require specific placements relative to the operator, and require specific playing directions relative to the operator. Failing to meet these requirements impacts the sound production of the speaker system. But because the operator station includes so many components, available space therein is limited and meeting the above requirements is challenging. Many known speaker systems in work machines do not meet these requirements, and those that do may be expensive or have drawbacks.

SUMMARY

Disclosed is a speaker system including a box and a speaker. The box includes a top wall, a front inner sidewall, and a back inner sidewall. The front inner sidewall connects to the top wall and extends upwards therefrom, and the back inner sidewall connects to the top wall and extends upwards therefrom. The speaker is positioned between the front inner sidewall and the back inner sidewall. The front of the speaker is mounted to a top of the top wall. The top wall, the front inner sidewall, the back inner sidewall, and a front of the speaker partially define a sealed space (i.e., an enclosure).

The disclosed speaker system may provide the required enclosure size for the speaker, despite the tight confines of the operator station. It may provide the proper placement of the speaker relative to the operator, again despite the tight confines of the operator station. And it may provide the appropriate playing direction relative to the operator, despite being under him or her.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
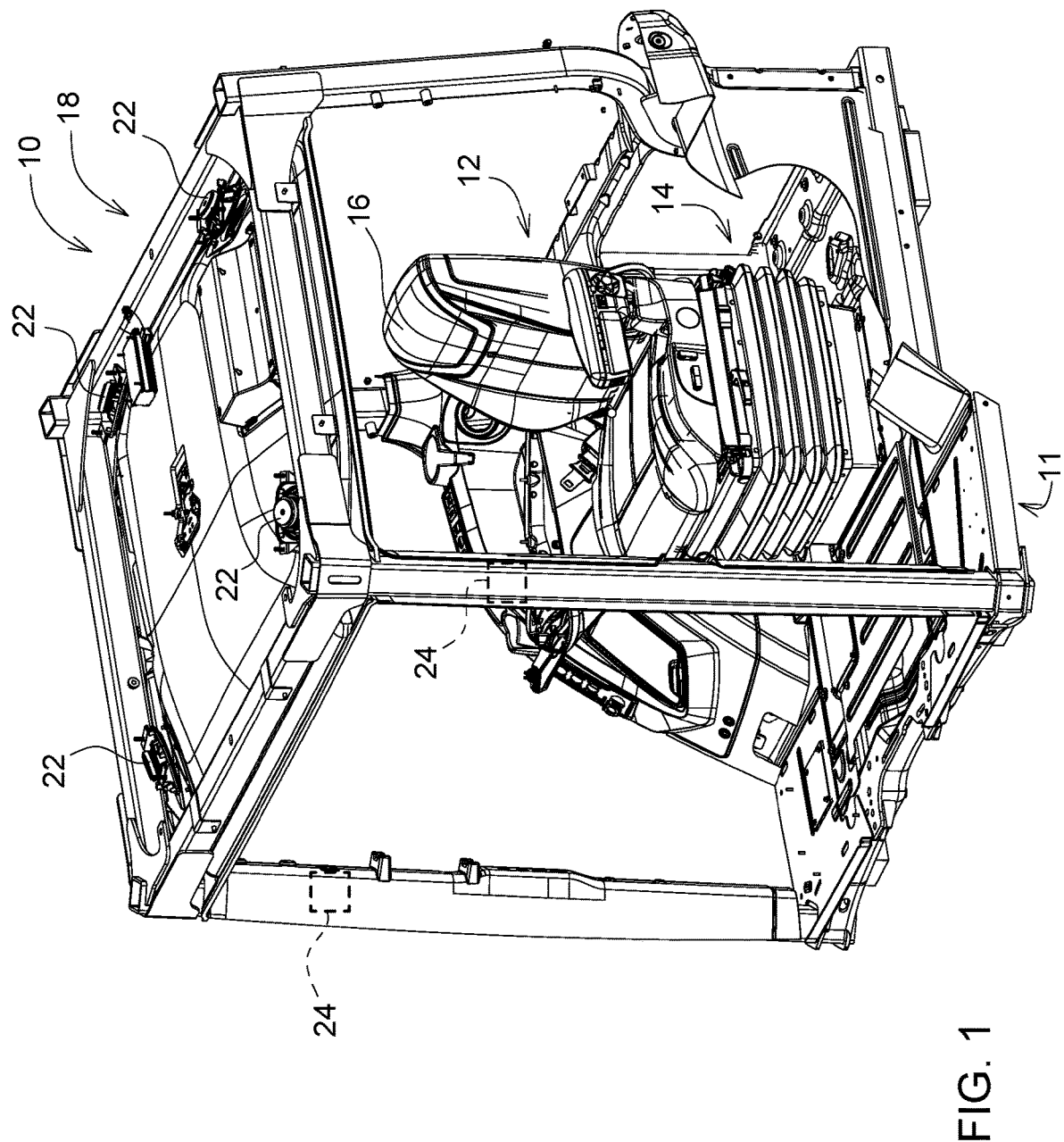
FIG. 1 is a perspective view of an operator station, a seat assembly, and a speaker system, portions of which are removed or shown in cutaway.
Figure 2:
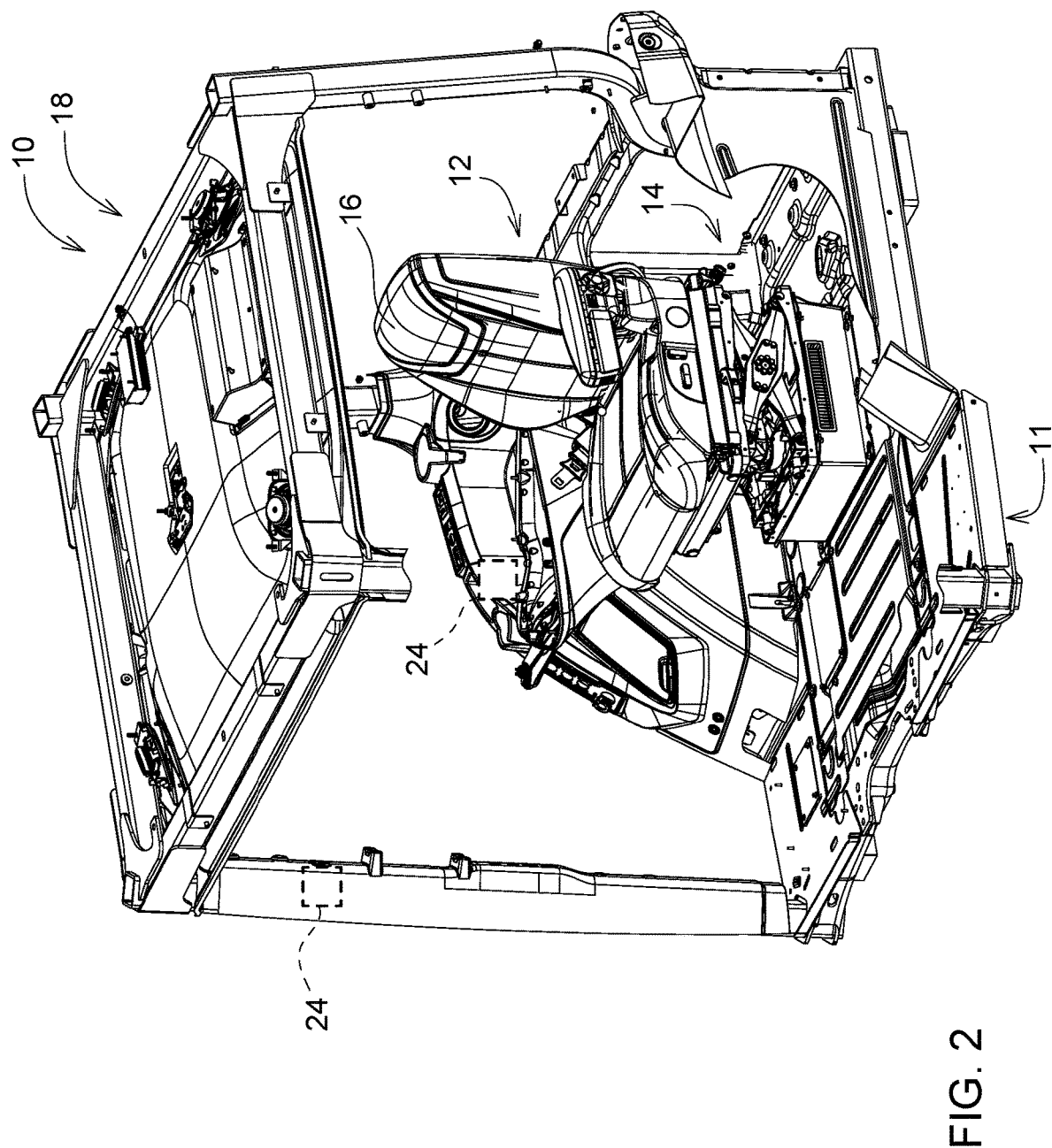
FIG. 2 is similar to FIG. 1, but showing additional portions in cutaway so as to highlight a box and a seat suspension assembly.
Figure 3:
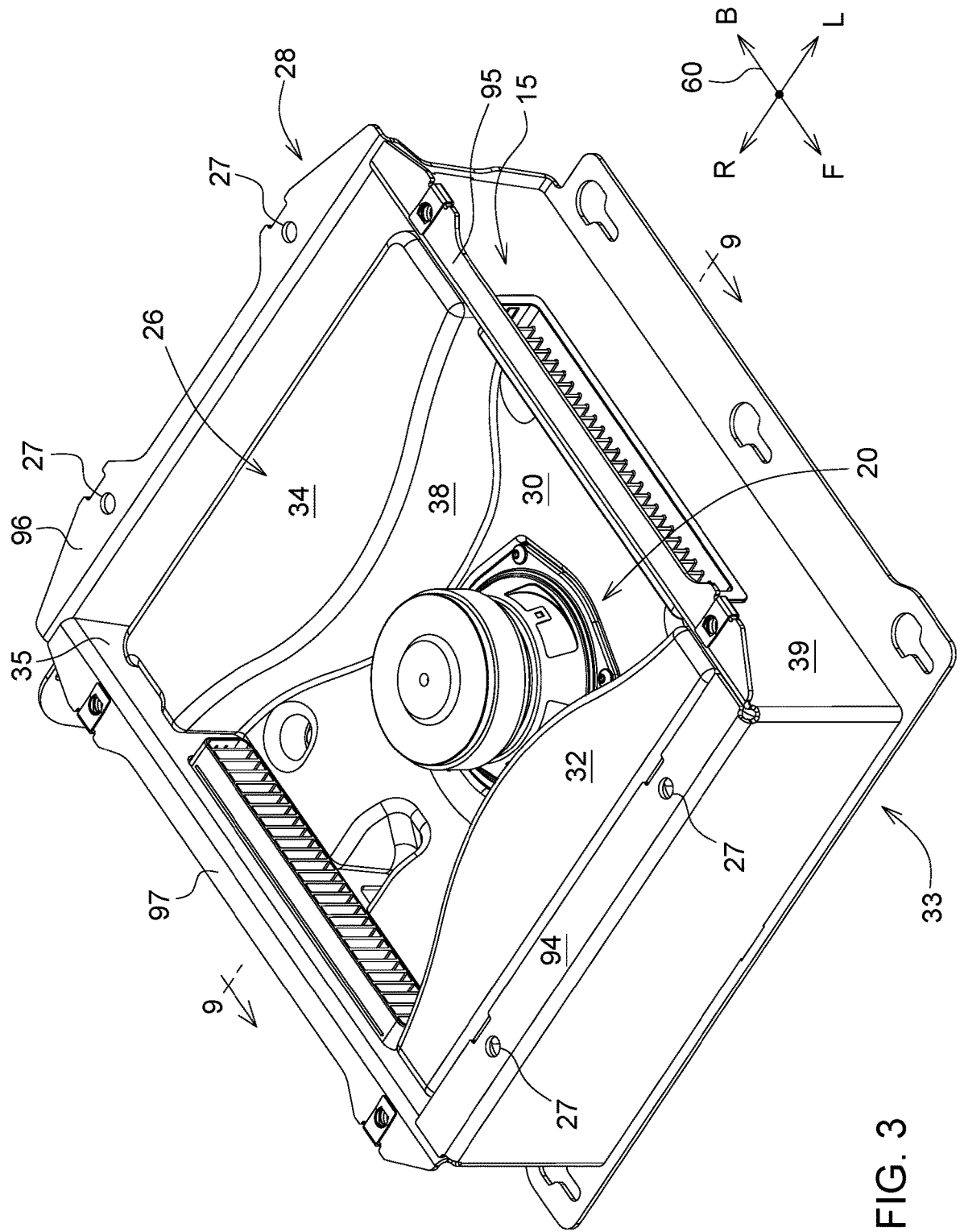
FIG. 3 is a perspective view of the box, an outer case, and a speaker.
Figure 4:
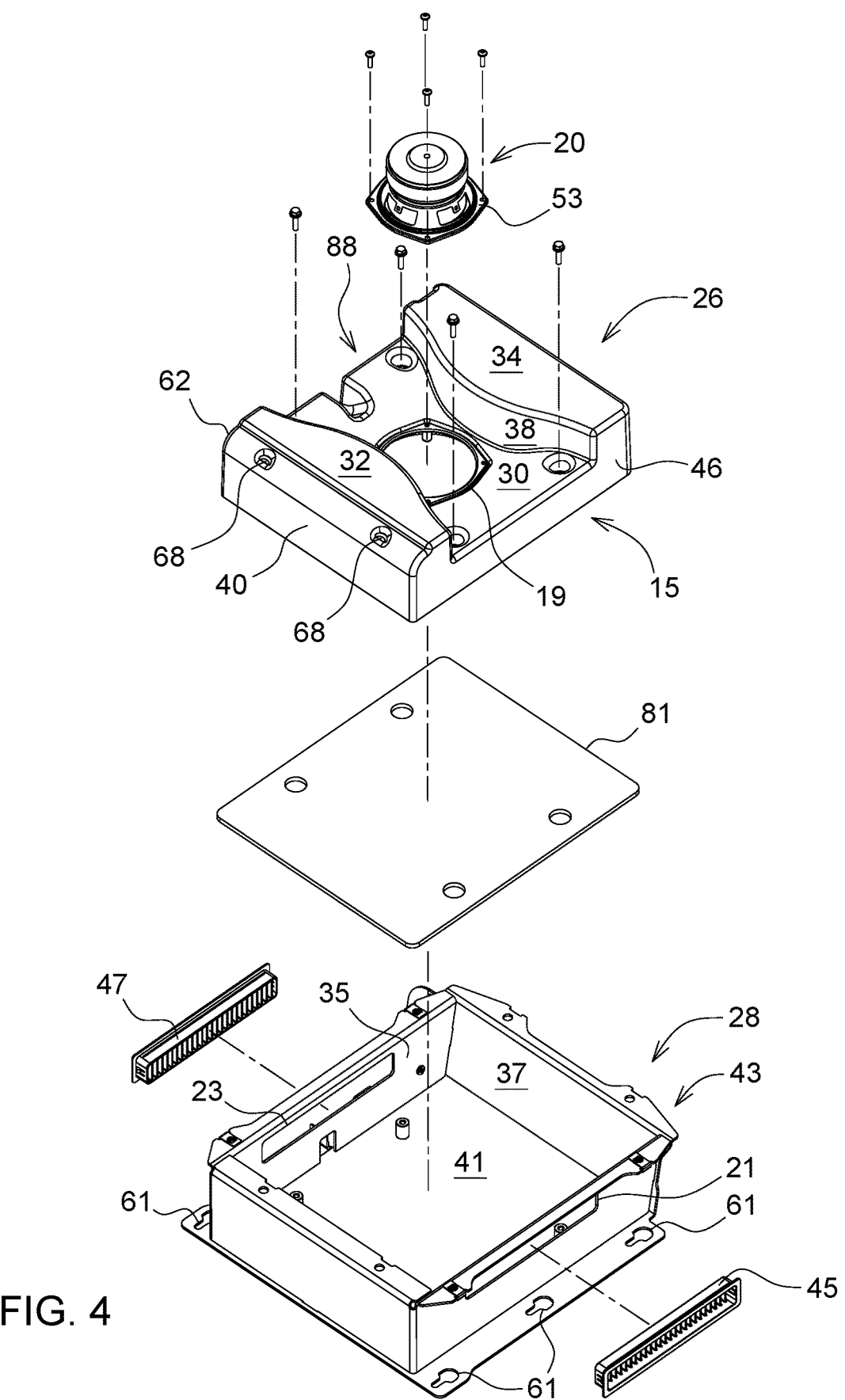
FIG. 4 is an exploded upper perspective view of the box, the outer case, and the speaker.
Figure 5:
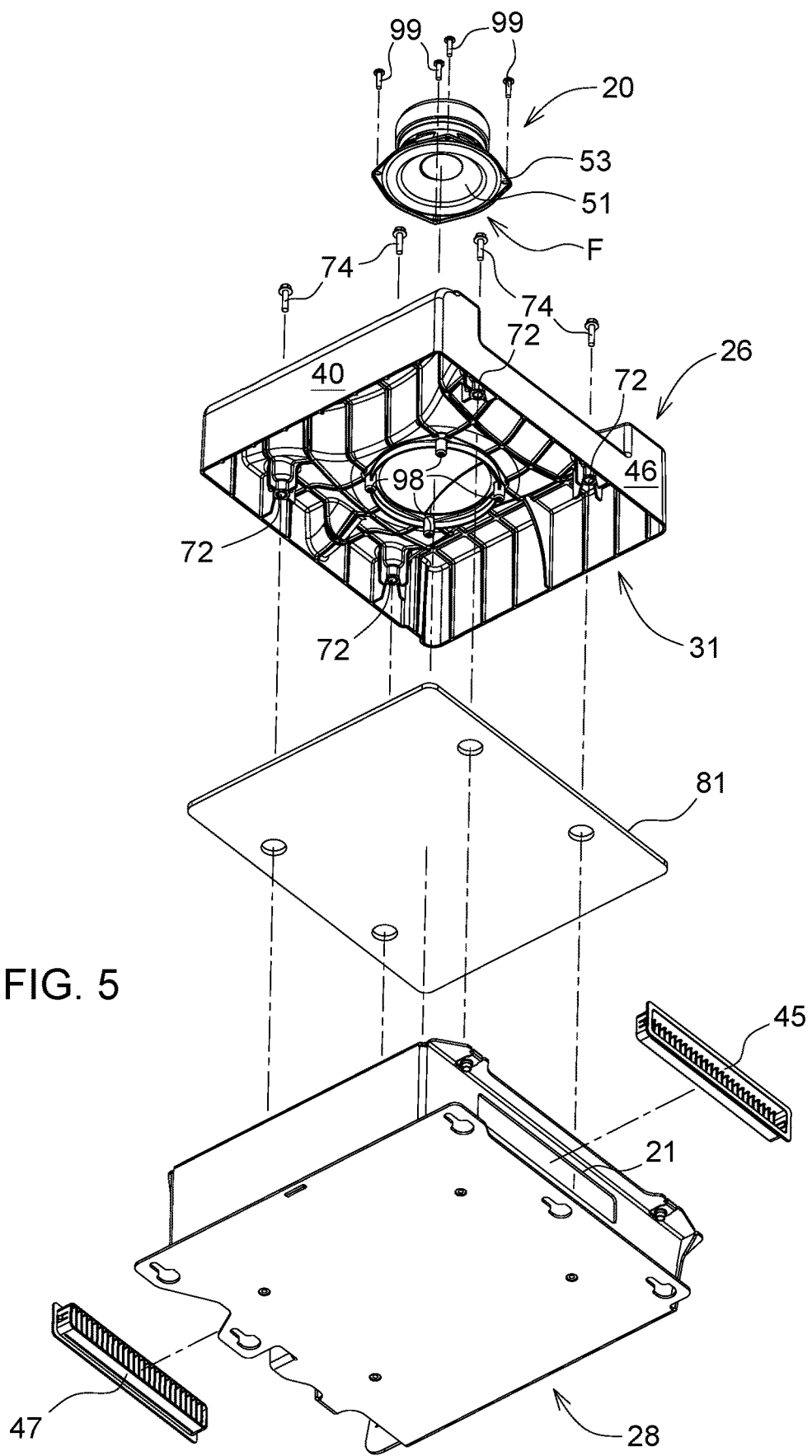
FIG. 5 is an exploded lower perspective view of the box, the outer case, and the speaker.
Figure 6:
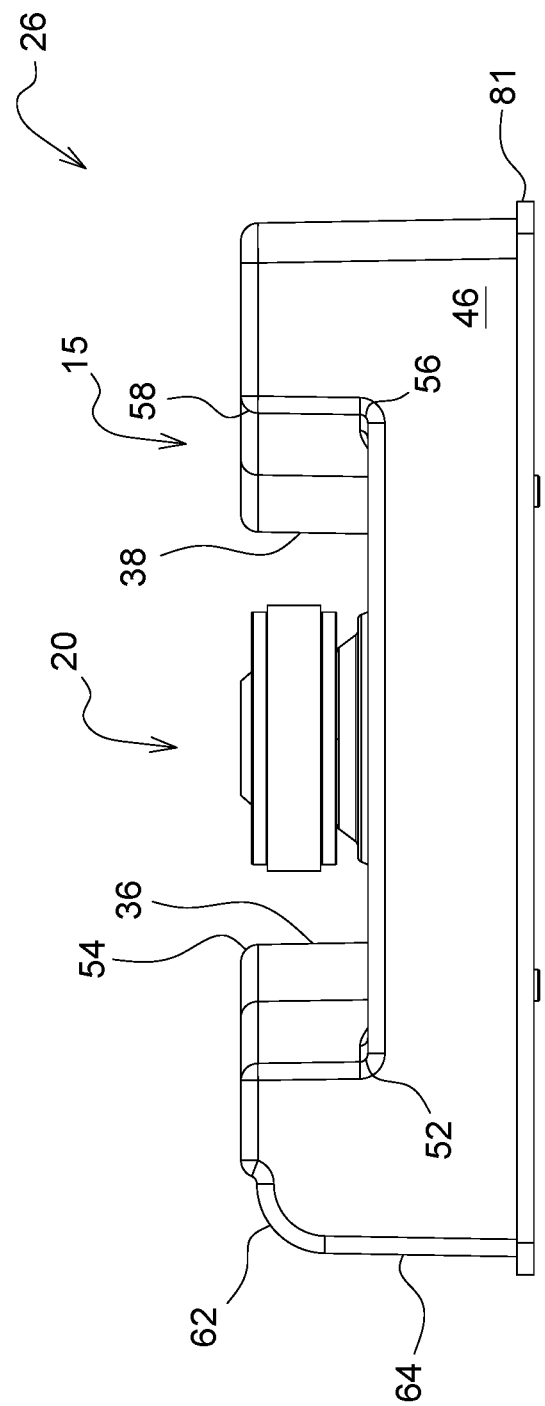
FIG. 6 is a left elevational view of the box.
Figure 7:
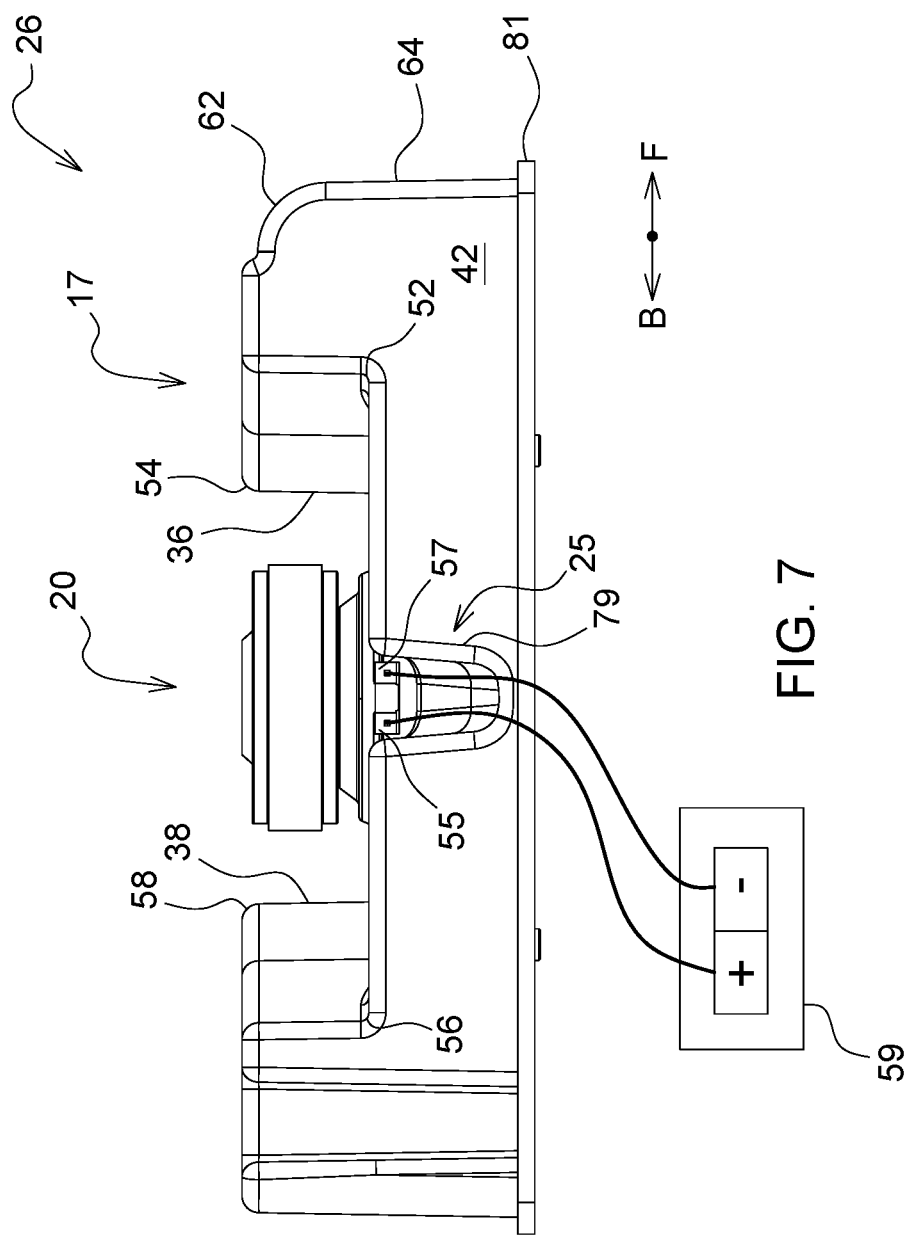
FIG. 7 is a right elevational view of the box.

Referring to FIGS. 1-2, there is shown an operator station 10 for a work machine.

Exemplarily, the work machine may be an agricultural tractor, a construction machine, or various other kinds of work machines. The work machine may be guided by an operator, who sits on a seat assembly 12. The seat assembly 12 may include a seat suspension assembly 14 and a seat 16. The operator sits directly on the seat 16 when operating the work machine. The work machine includes a speaker system 18 for providing sound in the operator station 10.

The seat suspension assembly 14 minimizes operator movement by sensing the movement of the work machine and actively positioning the seat 16, such that the vertical movement thereof is reduced. The seat suspension assembly 14 may include control valve assembly and a hydraulic cylinder that is connected thereto. Electrohydraulic valves may be located in the control valve assembly, and they may act on inputs from, for example, a position sensor and an accelerometer. Inputs from the sensors may control oil flow from the work machine to the hydraulic cylinder, so as to reduce the vertical movements of the operator.

The speaker system 18 includes a speaker 20 and a box 26. In some embodiments, the speaker 20 is a subwoofer 20. And in such an embodiment, the speaker system 18 may further include a plurality of full range speakers 22 and a pair of tweeters 24. The full range speakers 22 may be mounted to a roof of the operator station 10, and may project sound primarily downwards towards a central region of the operator station 10. Exemplarily, the full range speakers 22 may include whizzer cones. Further, the tweeters 24 may be mounted to respective front posts of the operator station 10. The tweeters 24 may project sound primarily backwards towards the central region, while the back of the subwoofer 20 may also project sound towards the central region.

As shown in FIGS. 1-9, the box 26 may include a top wall 30, a front inner sidewall 36 connecting to the top wall 30 and extending upwards therefrom, and a back inner sidewall 38 connecting to the top wall 30 and extending upwards therefrom. The subwoofer 20 is positioned between the front inner sidewall 36 and the back inner sidewall 38. The front F of the subwoofer 20 is mounted to a top of the top wall 30. The top wall 30 may include a speaker opening 19. The box 26 may be made of molded plastic. The internal surfaces of the box 26 may include ribs for increasing the strength thereof.

The box 26 may include a front upper top wall 32 and a back upper top wall 34. The front upper top wall 32 may connect to the front inner sidewall 36 and extend forwards therefrom, while the back upper top wall 34 may connect to the back inner sidewall 38 and extend backwards therefrom. And further, the box 26 may include a front outer sidewall 40, a right sidewall 42, a back outer sidewall 44, and a left sidewall 46. The front outer sidewall 40 may connect to the front upper top wall 32 and extend downwards therefrom. The right sidewall 42 may connect to a combination of the top wall 30 and the back upper top wall 34 and the front upper top wall 32, and it may extend downwards from the combination thereof. The back outer sidewall 44 may connect to the back upper top wall 34 and extend downwards therefrom. And the left sidewall 46 may connect to the combination of the top wall 30, the back upper top wall 34, and the front upper top wall 32, and it may extend downwards from the combination thereof.

The front inner sidewall 36 and the top wall 30 may define a lower front edge 52, and the front inner sidewall 36 and the front upper top wall 32 may define an upper front edge 54. The lower front edge 52 may be aligned with the upper front edge 54 along a front vertically oriented contour 48. And further, the lower front edge 52 and the upper front edge 54 may be oriented generally transversely. The back inner sidewall 38 and the top wall 30 may define a lower back edge 56, and the back inner sidewall 38 and the back upper top wall 34 may define an upper back edge 58. The lower back edge 56 may be aligned with the upper back edge 58 along a back vertically oriented contour 50. Further, the lower back edge 56 and the upper back edge 58 may be oriented generally transversely.

The front upper top wall 32 and the back upper top wall 34 may be horizontal walls and may be aligned at the same height. The top wall 30 is at a lower height than the front upper top wall 32 and the back upper top wall 34. The right sidewall 42 and the left sidewall 46 may be vertical walls and may extend in a fore-and-aft direction 60. The front inner sidewall 36, the back inner sidewall 38, the front outer sidewall 40, and the back outer sidewall 44 may be vertical walls. The front inner sidewall 36 and the back inner sidewall 38 may extend in a substantially transverse direction 66 (i.e., a straight line connecting the beginning and end points, but not necessarily the points therebetween, is transverse). Similarly, the front outer sidewall 40 and the back outer sidewall 44 may extend in a transverse direction 66.

The front outer sidewall 40 may include a top bend 62 and a vertical wall 64 that extends downwards from the top bend 62. The top bend 62 and the vertical wall 64 extend in the transverse direction 66. The top bend 62 may include a pair of anchoring points 68 for anchoring an outer case 28 or for the seat suspension assembly 14. For example, the fasteners may be threaded into the anchoring points 68 or be received by the anchoring points 68 (i.e., the fasteners are threaded into some other component of the operator station 10).

The top wall 30 may include anchoring points 72 for anchoring the box 26. For example, the fasteners 74 may be threaded into the anchoring points 72 or be received by the anchoring points 72. In the latter embodiment, the fasteners 74 may be threaded into the outer case 28 or into a floor 11 of the operator station 10. Further, the top wall 30 may include anchoring points 98 for anchoring the subwoofer 20. In such an embodiment, the fasteners 99 may be threaded into the anchoring points 98.

Figure 8:
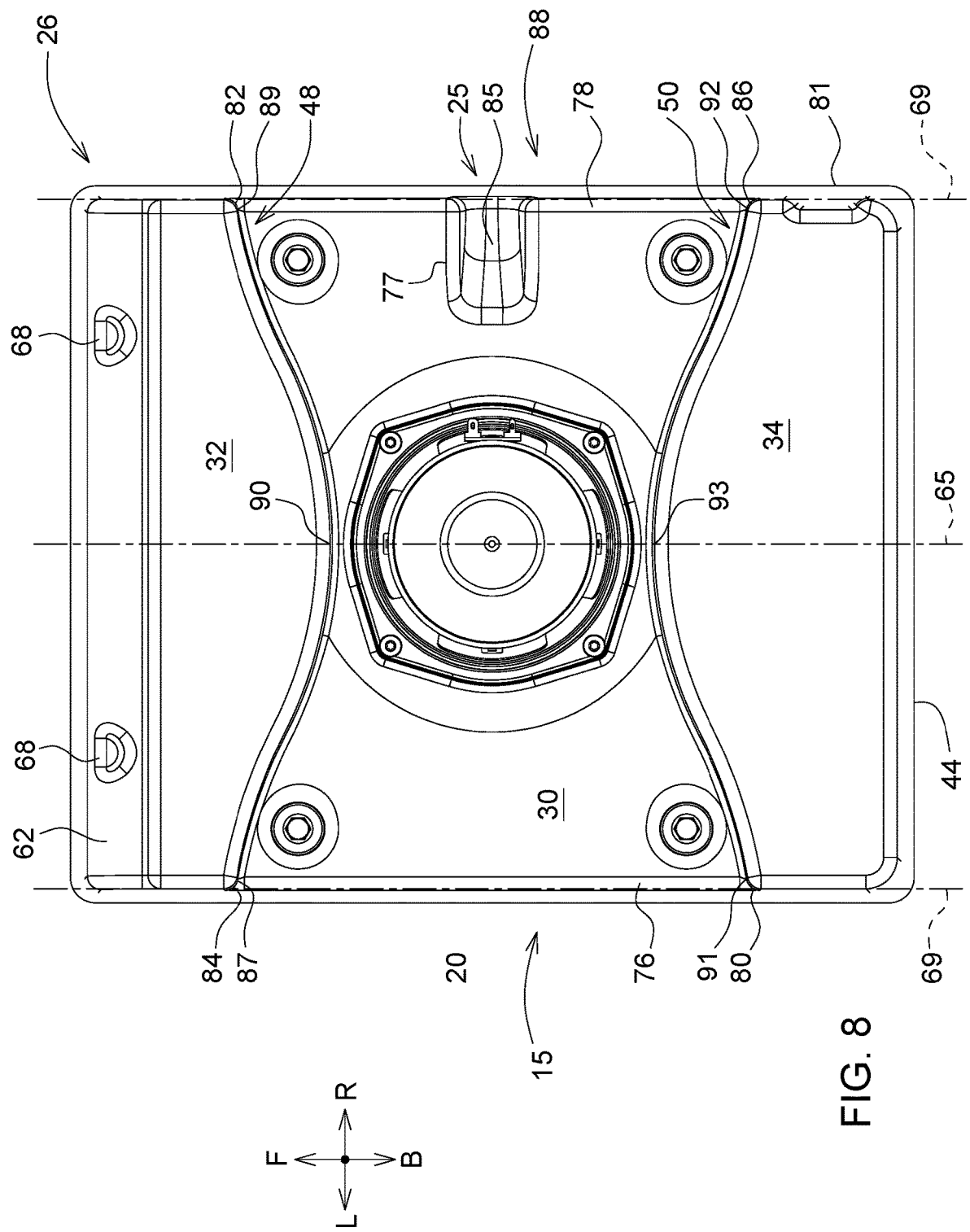
FIG. 8 is a top view of the box and the speaker.

As shown in FIG. 8, the top wall 30 may terminate at a left side edge 76 and at a right side edge 78. The back inner sidewall 38 may terminate at a left back edge 80 and at a right back edge 86. And the front inner sidewall 36 may terminate at a left front edge 84 and at a right front edge 82. The left side edge 76, the left front edge 84, and the left back edge 80 may partially define a left opening 15 for projecting sound from the subwoofer 20 to a left side of an operator. Similarly, the right side edge 78, the right front edge 82, and the right back edge 86 may partially define a right opening 88 for projecting sound from the subwoofer 20 to a right side of the operator.

The front inner sidewall 36 may be humped and may include a left front point 87, a right front point 89, and a peak front point 90 positioned transversely therebetween. In such embodiments, the front inner sidewall 36 may transition away from the subwoofer 20 starting from the peak front point 90 and ending at the left front point 87. And similarly, the front inner sidewall 36 transitions away from the subwoofer 20 starting at the peak front point 90 and ending at the right front point 89.

The back inner sidewall 38 may be humped and include a left back point 91, a right back point 92, and a peak back point 93 positioned transversely therebetween. The back inner sidewall 38 may transition away from the subwoofer 20 beginning at the peak back point 93 and ending at the left back point 91. Likewise, the back inner sidewall 38 may transition away from the subwoofer 20 beginning at the peak back point 93 and ending at the right back point 92. In such an embodiment, the front inner sidewall 36 and the back inner sidewall 38 combine, so as to define a double hump.

The subwoofer 20, the peak back point 93, and the peak front point 90 may be aligned along a fore-and-aft axis 65. The left front point 87 and the left back point 91 are aligned along a left fore-and-aft axis 67, and analogously the right front point 89 and the right back point 92 are aligned along a right fore-and-aft axis 69. In some embodiments, the fore-and-aft axis 65 may be a central fore-and-aft axis 65 defined by the seat assembly 12.

Figure 9:
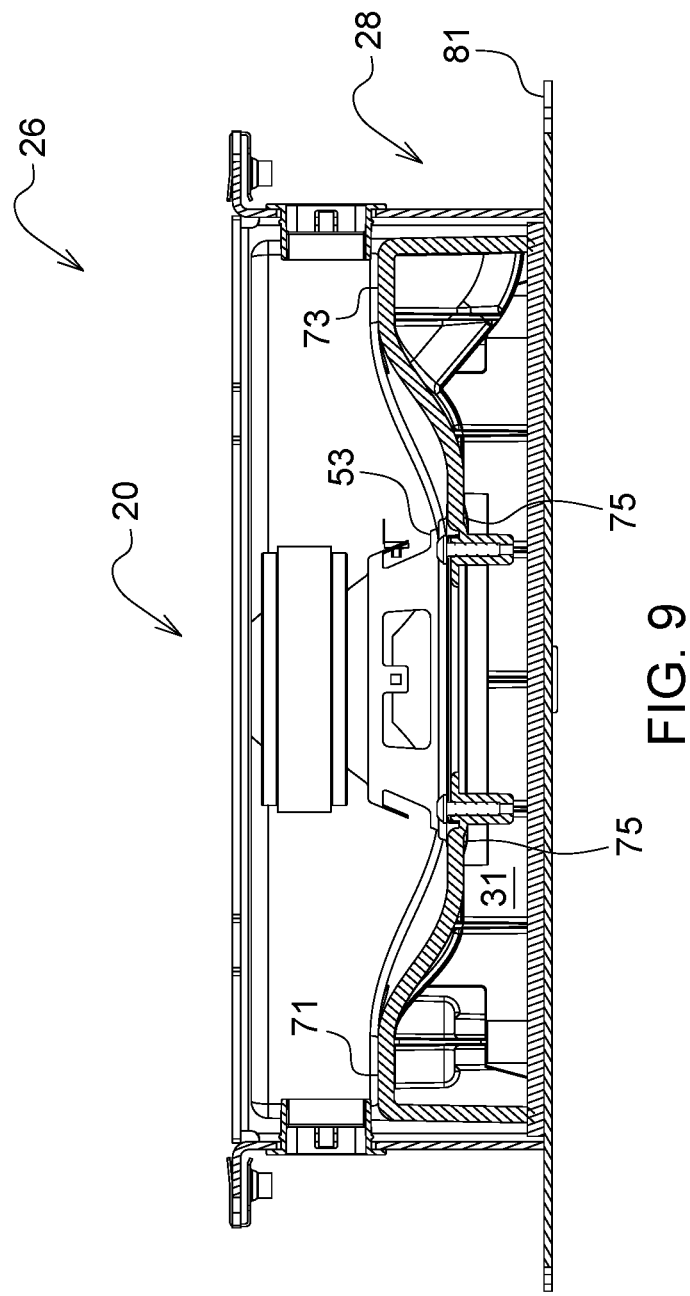
FIG. 9 is a rear section view of the box, the outer case, and the speaker taken along lines 9-9 in FIG. 3.

As shown in FIG. 9, the top wall 30 may include a left peak point 71, a right peak point 73, and a base point 75 positioned laterally therebetween and at a lower height. The left peak point 71 and the right peak point 73 may be aligned at the same height. The subwoofer 20 may be centered between the left peak point 71 and the right peak point 73, and further it may be centered about the base point 75.

As shown in FIGS. 3-9, the top wall 30, the front inner sidewall 36, the back inner sidewall 38, and a front F of the subwoofer 20 partially define a sealed space 31. Further, the front outer sidewall 40, the right sidewall 42, the back outer sidewall 44, and the left sidewall 46 also partially define the sealed space 31. The sealed space 31 is an airtight enclosure for providing precise, accurate bass. Outward waves travel into the operator station 10, while inward waves travel only into the sealed space 31. Because no air can escape the sealed space 31, the air pressure therein is constantly changing. As the driver moves in, the pressure increases. In contrast, as the driver moves out, the pressure decreases. These movements create a pressure differential between air inside the sealed space 31 versus the air outside thereof. This pressure differential pushes the driver to its resting state, the state at which the internal and external air pressures are equal.

The manufacturer of the subwoofer 20 may specify an acceptable volume range of the sealed space 31. Making the sealed space 31 either too big or too small relative to the subwoofer 20 will negatively impact the sound production thereof. In some embodiments, the subwoofer 20 may be a 5¼ inch subwoofer. It may have an impedance of 4 ohms, be rated for 100 watts, and require an enclosure that has a volume that is greater than 0.3 cubic feet. Its surround may be made of butyl rubber. Exemplarily, the box 26 for the subwoofer 20 may be 0.33 cubic feet and tuned to 70 hertz.

The subwoofer 20 may include a cone 51, a frame 53, a negative terminal 55, and a positive terminal 57. The front F of the cone 51 may partially define the sealed region and enclose the speaker opening 19 therein. The front F of the subwoofer 20 may face downwards, and a front F of the frame 53 may be directly coupled to a top of the top wall 30. In such an embodiment, the front F of the cone 51 partially defines the sealed space 31, while the back of the cone 51 projects sound to the operator. In such an embodiment, the subwoofer 20 may be wired 180 degrees out of phase, meaning that the positive lead is connected to the negative terminal 55, and the negative lead is connected to the positive terminal 57. By connecting the subwoofer 20 out of phase, the subwoofer 20 is directing sound via the back of the cone 51, rather than the front F of the cone 51, as with traditional cases and subwoofers. The subwoofer 20 may be operably coupled to an amplifier 59.

The outer case 28 may surround the box 26, and it may further include a bottom seal 81 sandwiched therebetween for reducing vibration in the sealed space 31. The bottom seal 81 may include openings for receiving the fasteners 74. A highest point of the subwoofer 20 may be substantially level with a highest point of the front upper top wall 32 and also with a highest point of the back upper top wall 34. By limiting the highest point of the subwoofer 20 in this manner, the outer case 28 may be mounted to the box 26 without interference with the subwoofer 20, and similarly the seat assembly 12 may be mounted to the outer case 28 without interference with the subwoofer 20.

The outer case 28 may include a front outer case wall 33, a right outer case wall 35, a back outer case wall 37, a left outer case wall 39, all of which may be vertical walls. The front outer case wall 33 and the back outer case wall 37 extend in the transverse direction 66, while the left outer case wall 39 and the right outer case wall 35 extend in the fore-and-aft direction 60. The outer case 28 may also include a bottom outer case wall 41. The bottom outer case wall 41 may partially define the sealed space 31 in cooperation with the box 26 and the subwoofer 20.

In some embodiments, the front outer case wall 33, the right outer case wall 35, and the left outer case wall 39 may be formed from a single piece of material (e.g., formed and bent from a single piece of steel). Similarly, in some embodiments, the back outer case wall 37 and the bottom outer case wall 41 may be formed from a single piece of material (e.g., formed and bent from a single piece of steel).

The top of the outer case 28 may be a mount for the seat assembly 12 or, more specifically, a direct mount for the seat suspension assembly 14 thereof. In some embodiments, the outer case 28 may also include a top outer case rim 43 that is horizontally oriented. The top outer case rim 43 may include a front rim 94, a left rim 95, a back rim 96, and a right rim 97. The front rim 94 and the back rim 96 may include anchoring points 27. The anchoring points 27 may be for the seat suspension assembly 14. Fasteners may be threaded into the anchoring points 27 or be received by the anchoring points 27. In the latter embodiments, the fasteners may be threaded into some other component of the operator station 10, such as the floor 11.

The bottom outer case wall 41 may also include anchoring points 61. The fasteners may thread into the anchoring points 61 or be received by the anchoring points 61. In the latter embodiment, the fasteners may be threaded into some other component of the operator station 10, such as into the floor 11. The bottom outer case wall 41 may slide into and engage with the fasteners.

The left outer case wall 39 may include a left sound opening 21 in alignment with the left opening 15, and the right outer case wall 35 may include a right sound opening 23 in alignment with the right opening 17. The speaker system 18 may also include a left louver 45 and a right louver 47, in which the left louver 45 is positioned in the left sound opening 21, and the right louver 47 is positioned in the right sound opening 23. The left and right louvers 45, 47 may be clipped into the outer case 28. The left and right louvers 45, 47 provide protection to the subwoofer 20, yet provide an adequate opening for sound to travel from the subwoofer 20 to the operator. The double hump funnels sound from the subwoofer 20 and out of the left and right louvers 45, 47. Because of the double hump, sound from the subwoofer 20 is directed 90 degrees from the axis defined by a cone 51 thereof.

The box 26 may include a slot 25 positioned under the right opening 17 for receiving wiring for the subwoofer 20. The slot 25 may include first and second end openings 77, 79, the first end opening 77 being formed into the top wall 30 and the second end opening 79 being formed into the right sidewall 42. The slot 25 may include a ramp 85 that connects the en d openings. Though not illustrated, in some embodiments, the slot 25 may instead be positioned under the left opening 15.

The detailed description in connection with the appended drawings is intended as a description of various embodiments of the described subject matter and is not necessarily intended to represent the only embodiment(s). Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

When an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Further, it will be further understood that terms such as "left," "right," "up," "down," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration.

What is claimed is:

1. A speaker system, comprising:
   a box including a top wall, a front inner sidewall connecting to the top wall and extending upwards therefrom, a back inner sidewall connecting to the top wall and extending upwards therefrom; and
   a speaker positioned between the front inner sidewall and the back inner sidewall;
   wherein a front of the speaker is mounted to a top of the top wall; and
   wherein the top wall, the front inner sidewall, the back inner sidewall, a bottom wall, and a front of the speaker partially define a sealed region;
   wherein when viewed from a rear sectional view;
   the top wall includes a left peak point, a right peak point, and a base point positioned therebetween;
   the left peak point and the right peak point are vertically aligned;
   the speaker is centered between the left peak point and the right peak point; and
   the speaker is centered about the base point.

2. The speaker system of claim 1, wherein a front of the speaker faces downwards.

3. The speaker system of claim 1, wherein the top wall includes a speaker opening; and
   wherein the speaker includes a cone and a front thereof partially defines the sealed region and encloses the speaker opening in the sealed region.

4. The speaker system of claim 1, wherein the speaker is wired 180 degrees out of phase.

5. A speaker system, comprising:
   a box including a top wall, a front inner sidewall connecting to the top wall and extending upwards therefrom, a back inner sidewall connecting to the top wall and extending upwards therefrom;
   a speaker positioned between the front inner sidewall and the back inner sidewall;
   a plurality of full range speakers configured to be mounted to a roof of an operator station, the full range speakers being configured to project sound primarily downwards towards a central region of the operator station; and
   a pair of tweeters configured to be mounted to respective front posts of the operator station, the pair of tweeters being configured to project sound primarily backwards towards the central region;
   wherein a front of the speaker is mounted to a top of the top wall;
   wherein the top wall, the front inner sidewall, the back inner sidewall, a bottom wall, and a front of the speaker partially define a sealed region;
   wherein the speaker is a subwoofer; and
   wherein a back of the subwoofer is configured to project sound towards the central region.

6. A speaker system, comprising:
   a box including a top wall, a front inner sidewall connecting to the top wall and extending upwards therefrom, a back inner sidewall connecting to the top wall and extending upwards therefrom; and
   a speaker positioned between the front inner sidewall and the back inner sidewall;
   wherein a front of the speaker is mounted to a top of the top wall;
   wherein the top wall, the front inner sidewall, the back inner sidewall, a bottom wall, and a front of the speaker partially define a sealed region;
   wherein the top wall terminates at a left side edge and at a right side edge;
   wherein the back inner sidewall terminates at a left back edge and at a right back edge;
   wherein the front inner sidewall terminates at a left front edge and at a right front edge;
   wherein the left side edge, the left front edge, and the left back edge partially define a left opening configured to project sound from the speaker to a left side of an operator; and
   wherein the right side edge, the right front edge, and the right back edge partially define a right opening configured to project sound from the speaker to a right side of the operator.

7. The speaker system of claim 6, further comprising an outer case surrounding the box, the outer case including a left sound opening in alignment with the left opening and a right sound opening in alignment with the right opening.

8. The speaker system of claim 7, further comprising a left louver positioned in the left sound opening and a right louver positioned in the right sound opening.

9. The speaker system of claim 7, wherein a top of the outer case is configured to be a mount for a seat assembly.

10. The speaker system of claim 7, wherein a top of the outer case is configured to be a direct mount for a seat suspension assembly.

11. A speaker system, comprising:
    a box including a top wall, a front inner sidewall connecting to the top wall and extending upwards therefrom, a back inner sidewall connecting to the top wall and extending upwards therefrom; and
    a speaker positioned between the front inner sidewall and the back inner sidewall;
    wherein a front of the speaker is mounted to a top of the top wall;
    wherein the top wall, the front inner sidewall, the back inner sidewall, a bottom wall, and a front of the speaker partially define a sealed region;
    wherein the box includes a front upper top wall and a back upper top wall;
    wherein the front upper top wall connects to the front inner sidewall and extends forwards therefrom; and
    wherein the back upper top wall connects to the back inner sidewall and extends backwards therefrom.

12. The speaker system of claim 11, wherein the front upper top wall is aligned with the back upper top wall along a horizontal plane.

13. The speaker system of claim 11, wherein the front inner sidewall and the top wall define a lower front edge;
    wherein the front inner sidewall and the front upper top wall define an upper front edge;
    wherein the back inner sidewall and the top wall define a lower back edge;
    wherein the back inner sidewall and the back upper top wall define an upper back edge;
    wherein the lower front edge is aligned with the upper front edge along a front contour; and
    wherein the lower back edge is aligned with the upper back edge along a back contour.

14. The speaker system of claim 11, wherein the box includes:
    a front outer sidewall connecting to the front upper top wall and extending downwards therefrom;
    a right sidewall connecting to a combination of the top wall and the back upper top wall and the front upper top wall and extending downwards from the combination thereof;
    a back outer sidewall connecting to the back upper top wall and extending downwards therefrom; and
    and a left sidewall connecting to the combination of the top wall and the back upper top wall and the front upper top wall and extending downwards from the combination thereof.

15. The speaker system of claim 14, wherein the front outer sidewall, the right sidewall, the back outer sidewall, and the left sidewall partially define the sealed region.

16. A speaker system, comprising:
    a box including a top wall, a front inner sidewall connecting to the top wall and extending upwards therefrom, a back inner sidewall connecting to the top wall and extending upwards therefrom; and
    a speaker positioned between the front inner sidewall and the back inner sidewall;
    wherein a front of the speaker is mounted to a top of the top wall;
    wherein the top wall, the front inner sidewall, the back inner sidewall, a bottom wall, and a front of the speaker partially define a sealed region; and
    wherein when viewed from a top view:

the front inner sidewall is humped and includes a left front point, a right front point, and a peak front point positioned transversely therebetween;

the front inner sidewall transitions away from the speaker starting from the peak front point and ending at the left front point; and the front inner sidewall transitions away from the speaker starting at the peak front point and ending at the right front point.

17. The speaker system of claim 16, wherein when viewed from the top view:

the back inner sidewall is humped and includes a left back point, a right back point, and a peak back point positioned transversely therebetween;

the back inner sidewall transitions away from the speaker beginning at the peak back point and ending at the left back point; and the back inner sidewall transitions away from the speaker beginning at the peak back point and ending at the right back point.

18. The speaker system of claim 17, wherein when viewed from the top view:

the speaker, the peak back point, and the peak front point are aligned along a fore-and-aft axis;

the left front point and the left back point are aligned along a left fore-and-aft axis; and the right front point and the right back point are aligned along a right fore-and-aft axis.

\* \* \* \* \*